(12) United States Patent
Larsen et al.

(10) Patent No.: US 7,445,431 B2
(45) Date of Patent: Nov. 4, 2008

(54) METHOD OF CONTROLLING AERODYNAMIC LOAD OF A WIND TURBINE BASED ON LOCAL BLADE FLOW MEASUREMENT

(75) Inventors: Torben Juul Larsen, Jyllinge (DK); Helge Aagaard Madsen, Roskilde (DK); Kenneth Thomsen, Hvalsø (DK)

(73) Assignee: Forskningscenter Risø, Roskilde (DK)

( * ) Notice: Subject to any disclaimer, the term of this patent is extended or adjusted under 35 U.S.C. 154(b) by 299 days.

(21) Appl. No.: 10/546,186

(22) PCT Filed: Feb. 18, 2004

(86) PCT No.: PCT/DK2004/000109

§ 371 (c)(1),
(2), (4) Date: Feb. 21, 2006

(87) PCT Pub. No.: WO2004/074681

PCT Pub. Date: Sep. 2, 2004

(65) Prior Publication Data

US 2006/0145483 A1 Jul. 6, 2006

(30) Foreign Application Priority Data

Feb. 18, 2003 (DK) ............... 2003 00249
Jan. 19, 2004 (DK) ............... 2004 00058

(51) Int. Cl.
*F03D 7/04* (2006.01)
(52) U.S. Cl. ............... 416/1; 416/30; 416/35
(58) Field of Classification Search ........ 416/1, 416/27, 30, 31, 35, 37
See application file for complete search history.

(56) References Cited

U.S. PATENT DOCUMENTS

| 4,161,658 A | 7/1979 | Patrick |
| 4,297,076 A | 10/1981 | Donham et al. |
| 4,339,666 A | 7/1982 | Patrick et al. |

(Continued)

FOREIGN PATENT DOCUMENTS

DE 31 06 624 9/1962

(Continued)

OTHER PUBLICATIONS

H. A. Madsen, "Aerodynamics and Structural Dynamics of a Horizontal Axis Wind Turbine", Risø-M-2902, Risø National Laboratory, Feb. 1991.

(Continued)

*Primary Examiner*—Edward Look
*Assistant Examiner*—Nathaniel Wiehe
(74) *Attorney, Agent, or Firm*—Hunton & Williams LLP

(57) ABSTRACT

The present invention relates to a method of controlling the aerodynamic load of a wind turbine's blades individually in such a way that the dynamic aerodynamic loads on the turbine are reduced and power production is optimised. In general the present invention will improve the overall stability of the turbine leading to reduce fatigue loads, reduced extreme loads during operation and reduced risk of blade-tower interaction. In particular preferred embodiment of the invention, flow properties are measured locally on the different blades or in front of the blades and from these measurements the pitch angle settings are changed, in other ways changing the aerodynamic properties, for the blades through a control unit.

14 Claims, 17 Drawing Sheets

U.S. PATENT DOCUMENTS

| | | | |
|---|---|---|---|
| 5,011,373 | A | 4/1991 | Aubry et al. |
| 5,335,175 | A * | 8/1994 | Turner .......................... 701/3 |
| 6,320,272 | B1 | 11/2001 | Lading et al. |
| 6,361,275 | B1 | 3/2002 | Wobben |
| 6,441,507 | B1 | 8/2002 | Deering et al. |
| 7,025,567 | B2 * | 4/2006 | Wobben ........................ 416/1 |
| 7,293,959 | B2 * | 11/2007 | Pedersen et al. .............. 416/23 |
| 2004/0067134 | A1 * | 4/2004 | Beauchamp et al. .......... 416/37 |

FOREIGN PATENT DOCUMENTS

| | | |
|---|---|---|
| EP | 0 321 336 | 12/1987 |
| EP | 0 359 624 | 3/1990 |
| EP | 0 998 634 | 2/1999 |
| EP | 0 995 904 | 4/2000 |
| EP | 1 241 850 | 9/2002 |
| EP | 1 243 790 | 9/2002 |
| NL | 1 018 670 | 4/2003 |
| WO | 01/33075 | 5/2001 |
| WO | WO 03/012293 A2 * | 2/2003 .................... 416/1 |

OTHER PUBLICATIONS

P. Caselitz, et al., "Reduction of Fatigue Loads on Wind Energy Converters by Advanced Control Methods", Proceedings of the International Conference held in Dublin Castle, Ireland, IWEA, 1997.

Bossanyi, "Individual Blade Pitch Control for Load Reduction", Wind Energy, vol. 6, p. 119-128, 2003.

J. T. Petersen, "The Aeroelastic Code HawC- Model Comparisons", 28$^{th}$ IEA Experts Meeting: 'State of the Art of Aeroelastic Codes', DTU, Lyngby, 1996.

T. J. Larsen, "Description of the DLL Regulation Interface in HAWC", Risø-R-1290(en), Risoe, National Laboratory, Sep. 2001.

Mann, "Wind Field Simulation", Prob. Engng. Mech., vol. 13, No. 4, p. 269-282, 1998.

* cited by examiner

PS

PS

TEF

Fig. 7
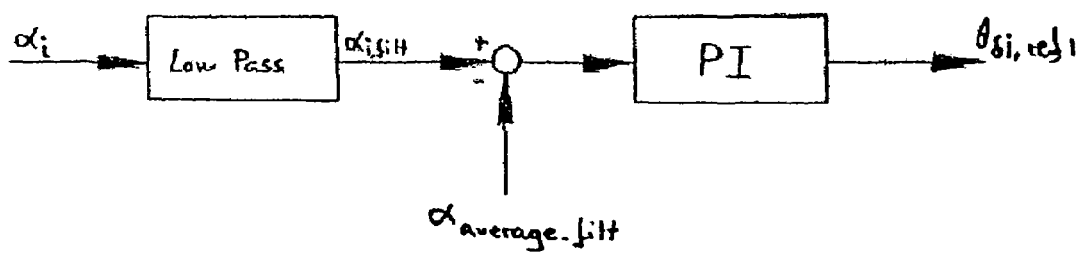
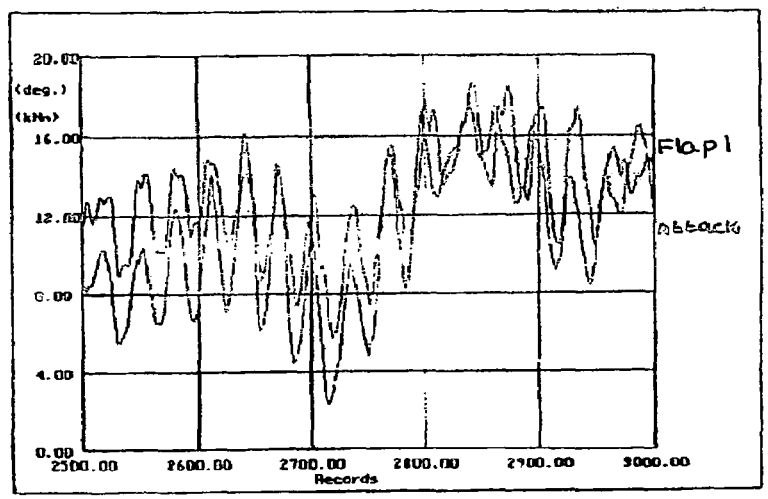
Fig. 8

METHOD OF CONTROLLING AERODYNAMIC LOAD OF A WIND TURBINE BASED ON LOCAL BLADE FLOW MEASUREMENT

CROSS-REFERENCE TO RELATED APPLICATIONS

This application is a U.S. National Phase of International Application No. PCT/DK2004/000109, filed Feb. 18, 2004, which claims priority to Denmark PA 2003 00249, filed Feb. 18, 2003 and Denmark PA 2004 00058, filed Jan. 19, 2004. The entire contents of all the above-identified applications are incorporated herein by reference.

The present invention relates to a method of controlling the aerodynamic load of a wind turbine's blades individually in such a way that the dynamic aerodynamic loads on the turbine are reduced and power production is optimised. In general the present invention will improve the overall stability of the turbine leading to reduced fatigue loads, reduced extreme loads during operation and reduced risk of blade-tower interaction. In particular preferred embodiment of the invention, flow properties are measured locally on the different blades or in front of the blades and from these measurements the pitch angle settings are changed, in other ways changing the aerodynamic properties, for the blades through a control unit.

In another aspect the invention relates to methods for the specific flow measurement as well as the method of designing the control system, and methods how to change the aerodynamic properties of the blades.

BACKGROUND OF THE INVENTION

Modern wind turbines are of such a size that the wind most rarely is uniform over the entire rotor area. These differences in wind speed, which are a result of turbulence, wind shear, yaw error operation, tower shadow, wake effects etc., results in varying aerodynamic forces on the blades during rotation, causing major fatigue loads on the turbine and in some cases also extreme loads.

Traditional control of pitch regulated turbines are methods of controlling the collective pitch (i.e. all the blades are turned simultaneous to the same angle) settings of all blades to provide an optimised yet well defined power output of the turbine. From U.S. Pat. No. 4,339,666 it is known to control the pitch angles in such a way that maximum loads on the rotor and generator is below maximum allowable values. This patent describes the use of average wind velocity and turbulence as the primary controlling parameters. The disadvantage is however that variation in wind speed over the rotor area is not taken into consideration.

From patent WO0133075 a method of how to control pitch angles of the wind turbine based on measurements of mechanical loads on the turbine in such a way that non-uniform wind load are compensated by individual pitch. The disadvantage is however that due to the large aerodynamic damping of the blades, the mechanical loads will be measured some time after the wind disturbance has occurred.

From patent U.S. Pat. No. 6,361,275 a wind turbine is patented that uses individual pitch for active load reduction. This patent focus mainly on the effects on measuring loads with strain gauges or similar on the blades and the hub. In connection to the load measurements, measurements of the local wind velocity and wind direction on the blades are mentioned. The aerodynamic measurements are a supplement to the load measurements. It is however not stated how to use these different flow sensors, since the focus is on the load measuring properties. The aerodynamic sensors are placed on the trailing edge of the blade and the only way to change the aerodynamic loading is by pitching the blades or parts of the blades.

DESCRIPTION OF THE INVENTION

It is an object of the preferred embodiments of the present invention to remedy the above drawbacks by providing a method for controlling the operation of a wind turbine based on measurements of local aerodynamic flow parameters on the blades or in front of the blades. A particular preferred embodiment of the present invention measures and uses flow parameters. The method preferably also comprises steps and means for calculation of the load reducing individual pitch angle settings, as an overlaying signal to the power related collective pitch setting.

According to preferred embodiments of the present invention, a method for controlling individually the operational condition of each blade of a wind turbine preferably comprising at least two blades is provided. The method comprises preferably the steps of determining at least one aerodynamic flow property in the vicinity of each blades and determining based on the determined flow property or properties one or more operational condition, such as pitch angle, flap angle or the like, for each blade.

In a particular preferred embodiment of the invention, the operational condition for a given blade is the pitch angle and wherein said pitch angle comprise a contribution determined on the basis of the angle of attack for the blade and a contribution determined on the basis of the velocity relatively to the blade. The invention also comprises a wind turbine being adapted to carry out the method according to the invention.

In the following preferred embodiments of the present invention will be described in connection with the accompanying drawings, in which FIG. 1 shows schematically a rotor of a wind turbine, FIGS. 2-5 show different embodiments of blades according to preferred embodiments of the present invention being equipped with flow measurement devices. In FIGS. 5a and 5b PS means pressure sensors and are indicated by the thick black lines, FIG. 6 shows a blade according to preferred embodiment of the present invention having trailing edge flap denoted TEF in the figure, FIG. 7 shows schematically a regulator system according to preferred embodiments of the invention for controlling the aerodynamic load of a wind turbine, FIG. 8 shows measurement of angle of attack and flapwise blade bending moment on a Tellus T-1995. A good correlation is seen. From Madsen 1991; Header text: RISO NATIONAL LABORATORY, DENMARK; Oct. 31, 1990; 12:50; File: D:\t132bi\t32ix1 Points averaged 15; Records: 2500-2999, FIG. 9 shows in a schematically manner the correlation between angle of attack and lift and drag respectively, FIG. 10 shows in a schematically manner the correlation between angle of attack and lift, and indicates in particular the non-linear part of the this correlation, FIG. 11 shows schematically a blade, for which the camber may be changed, FIG. 12 shows schematically a blade having a movable trailing edge denoted MTE in the figure, FIG. 13 shows ratio between optimal cyclic pitch amplitude $\theta_{cyc}$ and in-plane wind speed $V_x$ plotted as function of out-of-plane wind speed $V_y$.

FIG. 14 shows ratio between optimal cyclic pitch amplitude $\theta_{cyc}$ and in-plane wind speed $V_x$ plotted as function of the squared ratio between rotational speed and rated rotational peed, FIG. 15 shows ratio between optimal cyclic pitch amplitude θcyc and in-plane wind speed $V_x$ plotted as function of collective pitch angle, FIG. 16 illustrates symbols used herein, FIG. 17 shows uniform inflow at 20 m/s with a special negative wind shear. Collective pitch regulation. From top: Wind speed at hub and rotor bottom, pitch angle of blade 1 and average, angle of attack of blade 1 and average angle of attack, in-plane relative velocity of blade 1 and average, blade 1 flap moment at root and yaw moment at tower top, FIG. 18 shows uniform inflow at 20 m/s with a special negative wind shear. Individual pitch regulation. From top: Wind speed at hub and rotor bottom, pitch angle blade 1 and average, angle of attack of blade 1 and average angle of attack, in-plane relative velocity of blade 1 and average, blade 1 flap moment at root and yaw moment at tower top.

This new load reducing regulation strategy is preferably based on measurement of the inflow parameters angle of attack and relative velocity. It is clear that a very strong correlation between changes in inflow parameters and blade load response exist, see. eg Madsen-1991, FIG. 8, and that if the inflow is known, actions can be done to alleviate the following load increment.

Figure 1:
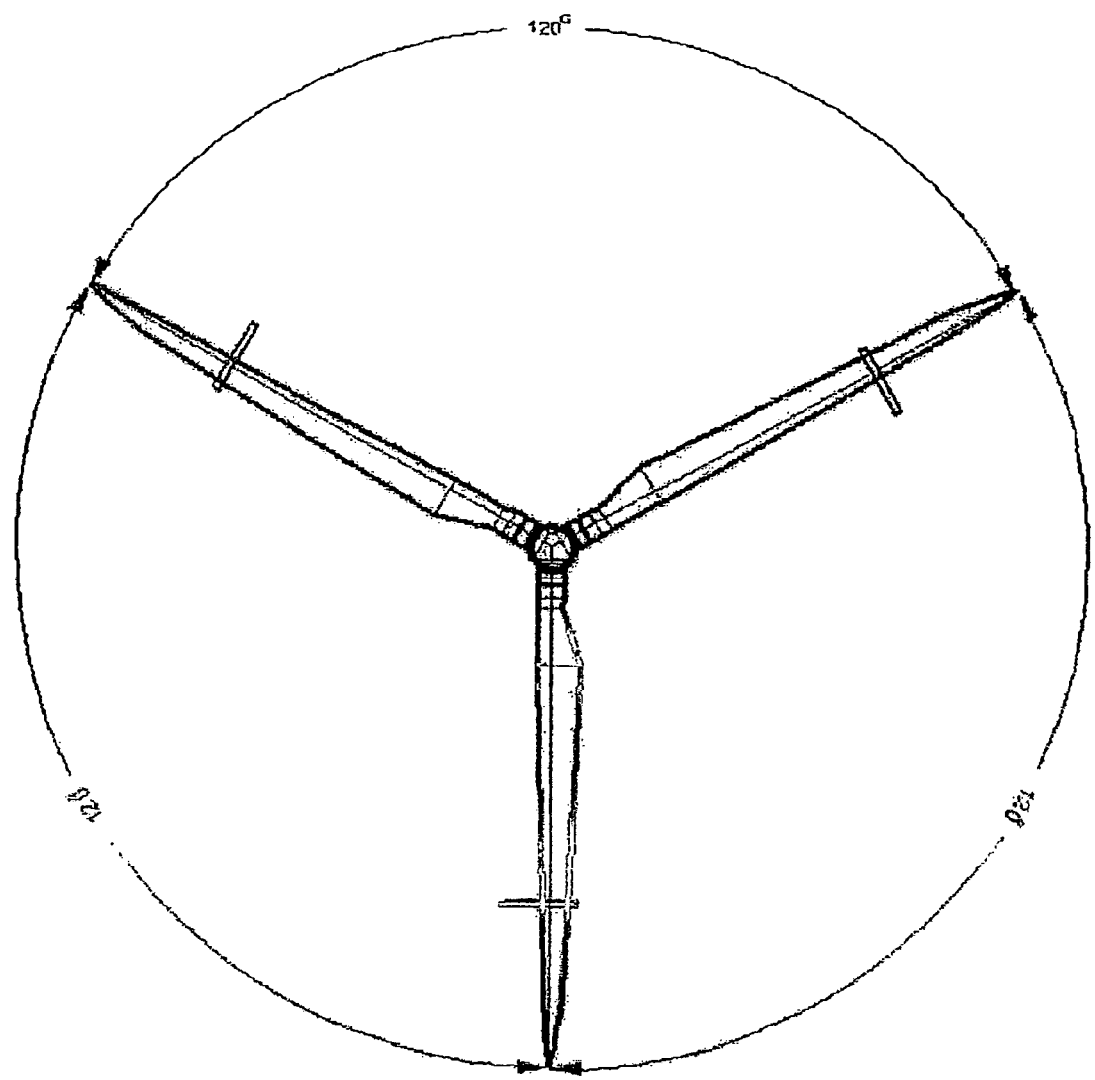
Figure 2:
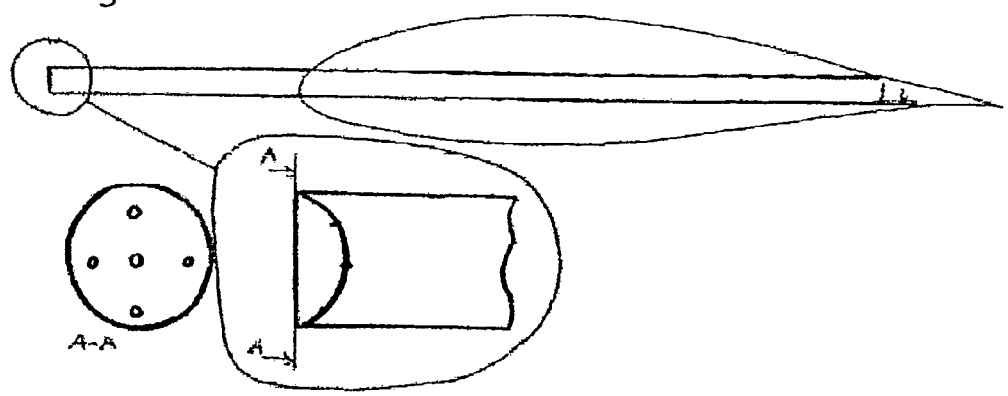
Figure 3:
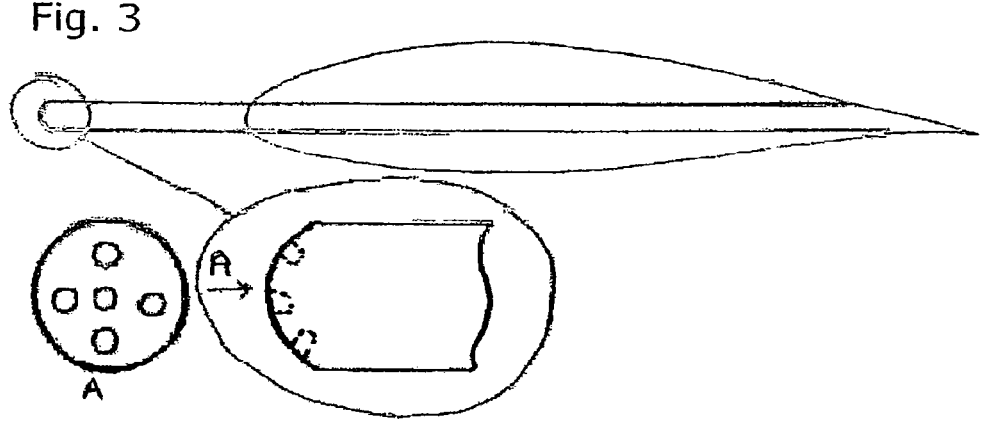

The most direct properties to be measured is, at present, considered to be the local relative wind velocity and angle of attack at the single blade in a representative distance from the hub. This can be done using a pitot tube, see FIG. 2 mounted at ¾ to ⅚ of blade radius, see. FIG. 1. The advantage of this system is that both velocity and angle of attack are measured and that the measurement can be done in front of the blade. Preferably the system is designed in a way that makes it robust and easy to maintain. Another way to measure the wind velocity and angle of attack in front of the blade is to use a tube with pressure measurement devices. Same principle as the pitot tube, this embodiment is an example of a robust and easy to maintain design, see FIG. 3

Figure 4:
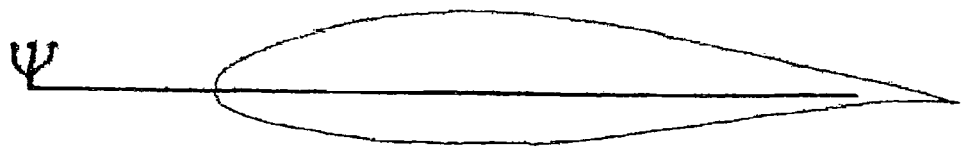

A third way to measure the velocity and angle of attack is to use a sonic anemometer placed in front of the blade, see FIG. 4. When using this system, temperature ranges in which the system is used should be considered.

Figure 5A:
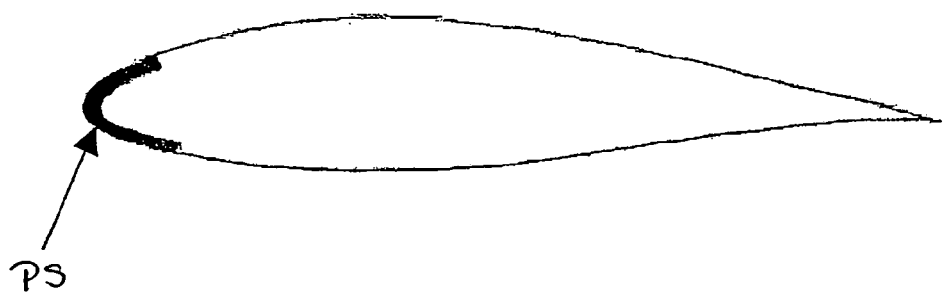
Figure 5B:

A fourth way to measure the velocity and angle of attack is by measuring the local pressure distribution on the blade profile, see FIG. 5a, 5b.

Figure 6:
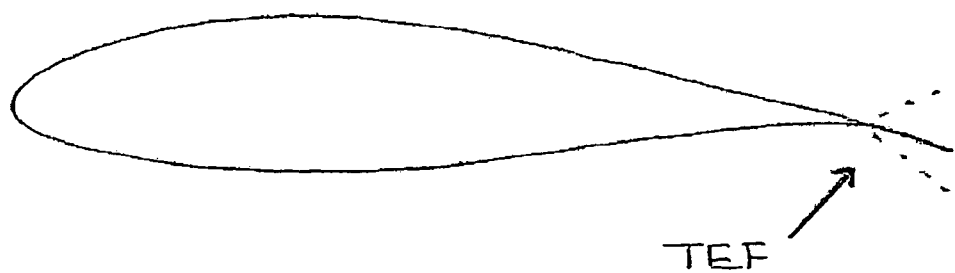

A fifth way to measure the angle of incidence is using a movable trailing edge flap, see FIG. 6.

In accordance with a general principle of the invention, the method preferably utilises measured aerodynamic parameters to control the pitch angles of the blades in such a way that dynamic loads are reduced and the power output of the turbine remains unchanged or even slightly increased. Thus, the invention is preferably based solely on aerodynamic properties and the method does therefore preferably not utilise direct measurements of for instance mechanical load.

Since, in general, there is a direct relation between angle of attack and aerodynamic lift, the differences on the aerodynamic lift of the rotor blades may be much reduced if the angle of attacks are the same for the three blades. In accordance with preferred embodiments of the invention, one way to do so is to minimise the error between the instant angle of attack of the blade and the average angle of attack of all blades. This can be done e.g. by using a proportional-integral regulator as illustrated in FIG. 7. As for the angle of attack also the local velocity on the blade is influencing the aerodynamic force. However, since a change in pitch angle does not change the velocity, another control system should be applied for this measurement signal, and a proportional pitch angle regulation based on the difference between local velocity and average velocity for the blades is a suitable method.

One advantage of the above mentioned control systems is that the power output of the turbine will not be affected when properly operated. The power output controller is controlling the collective pitch settings of the blades where this invention provides an overlying pitch signal that is load reducing. Since the angle of attack preferably is measured it is also possible to optimise the collective pitch angles, hence produce more power. The reason for this is that the local aerodynamic profile has an optimal angle of attack, where the lift is high and the drag is low. At low wind speed, where a power output optimisation is desired, the collective pitch angle setting can be controlled by the average angle of attack measurement.

Since the relation between lift, drag and angle of attack is highly non-linear in the region of maximum lift the load reducing control part stated above is believed to result in better power output performance as the angle of attacks of the blades will be more constant, hence have a higher mean average in lift.

Several ways to construct an inflow based regulator has been investigated. One of the most promising methods is to divide actions based on angle of attack measurement from actions based on relative velocity. This is basically due to the assumption that if the local angle of attack is kept the same on all three blades—the load will be the same. This works however only when no skew inflow (yaw error, hill slope, rotor tilt etc.) occurs since such a load situation creates significant changes in relative velocity and so causing varying loads on the rotor. The skew inflow can be compensated by action based on the relative velocity since flow in plane with the rotor creates a 1P varying relative velocity. If the pitch angle is varied in phase with the change in relative velocity the load will decrease—the difficulty of this is to change the pitch with as little phase delay as possible and with the correct amplitude of movement. Pitch references from the angle of attack part is notated $\theta_{\delta i,a}$ for blade number i, and pitch references from the relative velocity part is notated $\theta_{\delta i,b}$. Furthermore it is important to make sure that actions from the relative velocity do not affect the angle of attack regulator. This is described later herein.

Actions Based on Measurements of Angle of Attack

"If the angle of attack is kept the same on all three blades the load will be the same" is the essential idea for this part of the regulation. This is a very effective load reduction procedure to eliminate loads originating from wind shears or low frequent turbulence in the wind direction. It can be done by using a PI-regulator controlling the pitch angle based on the error between the angle of attack of the single blade and the average angle of attack, see FIG. 7. The small finesse by using the error between the angle of attack on the single blade and the average for all blades results in a system that does not conflict with the collective pitch regulator. The collective pitch regulator controls the average level, whereas the individual pitch regulator minimizes the difference in angle of attack on the blades. It is evident that the measurement and action can be done with as little phase delay as possible.

Actions Based on Measurements of Relative Velocity

In contrast to the measured angle of attack it does not seem feasible to use a PI-based regulator unit on the relative velocity part since the change in velocity is hardly affected by changes in the pitch angles. Therefore a model-based regulator needs to be used. Based on simulations it is clear that the pitch angle needs to vary in phase with the difference in relative velocity. The crux is to determine the correct amplitude of pitch variation since this differs depending on at least the wind speed and the size of in-plane relative velocity.

Figure 13:
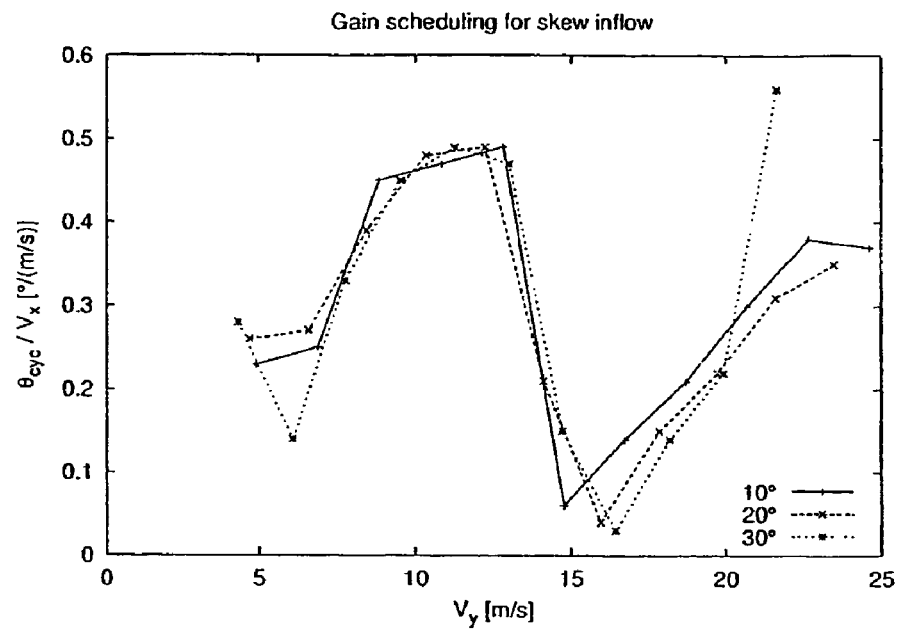
Figure 14:
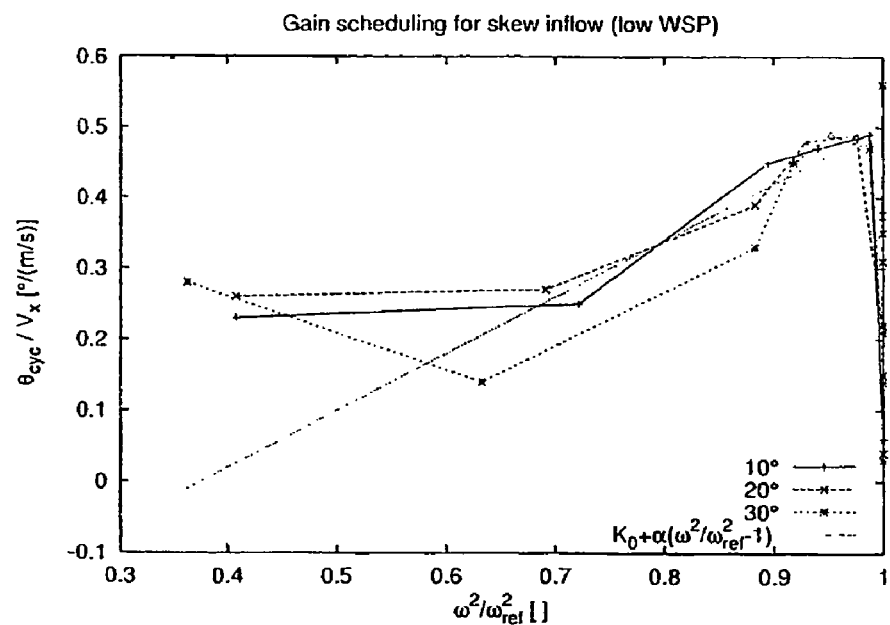
Figure 15:
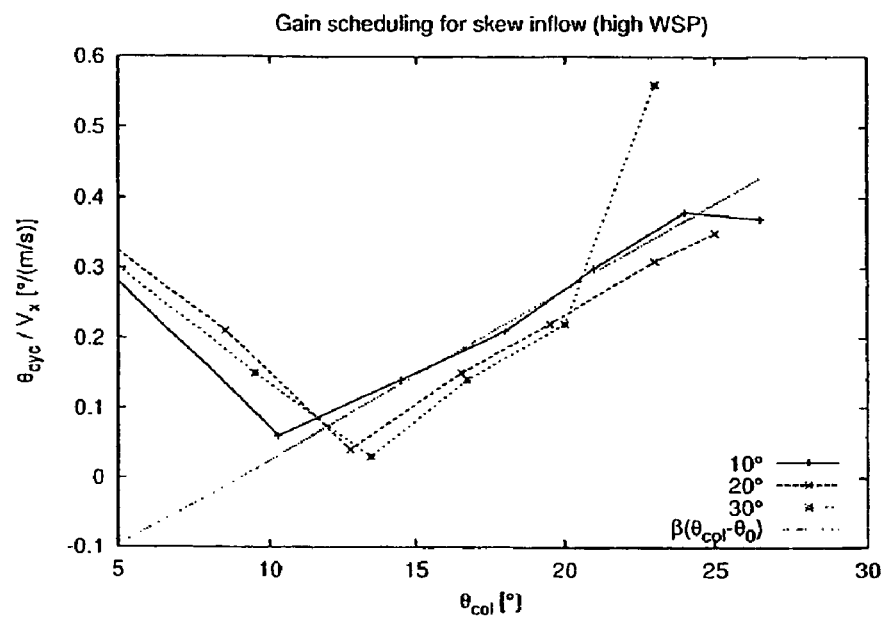

The particular relative velocity regulator used in this analysis is based on a calculation of wind speeds in plane with the rotor $V_x$.

$$V_x = V_{rel} \cos(\alpha + \theta) \tag{1}$$

$$\theta_{\delta i, b} = (V_x - V_{x,ave}) K(\omega, \theta_{col}) \tag{2}$$

where $(V_x - V_{x,ave})$ is the error between in-plane relative velocity on the single blade and the average in-plane relative velocity of the three blades and $K(\omega, \theta_{col})$ is a gain function. This gain function is in principle a function of wind speed, but it is more robust to use the collective pitch angle at high wind speeds and the rotor speed at low wind speed. The gain function is based on calculations in skew inflow with the turbine equipped with a cyclic pitch regulator, since this regulation is very suitable to compensate such inflow, see Caselitz-1997 and Bossanyi-2003. With these calculations the optimal amplitude has been found. The gain function is determined by plotting the results as in FIG. 13. The same results have been plotted as function of rotor speed and pitch angle in FIGS. 14 and 15 leading to the gain function formulated in equation (3). A special feature of the non-linear gain function is also that there is a sign change of the gain. At low wind speeds the pitch angles shall be varied in phase with the Variation in relative velocity whereas at high wind speed above rated the variation shall be in counterphase.

$$K(\omega, \theta_{col}) = \begin{cases} -\left(K_0 + \alpha\left(\frac{\omega^2}{\omega_{ref}^2} - 1\right)\right), & \omega < 0.95\omega_{ref} \wedge \theta_{col} \leq \theta_0 \\ 0, & \omega \geq 0.95\omega_{ref} \wedge \theta_{col} \leq \theta \\ \beta(\theta_{col} - \theta_0), & \theta_{col} > \theta_0 \end{cases} \tag{3}$$

where $\alpha$ and $\beta$ are slopes of the curves in FIGS. 14 and 15, $K_0$ is the gain at $\omega = \omega_{ref}$ in FIG. 15, $\theta_0$ is the pitch angle with zero gain (approx. 9° in FIG. 15), $\theta_{col}$ is the collective pitch angle, $\omega$ is the rotational speed of the rotor and $\omega_{ref}$ is rated rotational speed of the rotor.

How to Avoid Interference Between the Two Flow Regulators

When the turbine operates in skew inflow a variation in the in-plane relative velocity $V_x$ occurs. This variation may cause a change in angle of attack, which then causes the angle of attack regulator to make wrong pitch angle adjustements. Therefore this deterministic change in angle of attack caused by changes in $V_x$ needs to be removed and so does the changes in pitch angles caused by the relative velocity regulator.

The variation in angle of attack due to changes in $V_x$ is approximately $$\alpha(V_{x,i}) = A\tan\left(\frac{V_{y,ave}}{V_{x,i}}\right) - \Phi_{ave} \tag{4}$$

where $$\alpha(V_{x,i}) = \frac{1}{B}\sum_{i=1}^{B} A\tan\left(\frac{V_{y,i}}{V_{x,i}}\right) \tag{5}$$

where B is the number of blades. The modified input to the angle of attack regulator is $$\alpha_{input} = \alpha_i - \alpha_{ave} - \left(A\tan\left(\frac{V_{y,ave}}{V_{x,i}}\right) - \Phi_{ave}\right) + \theta_{\delta i, b} \tag{6}$$

Figure 16:
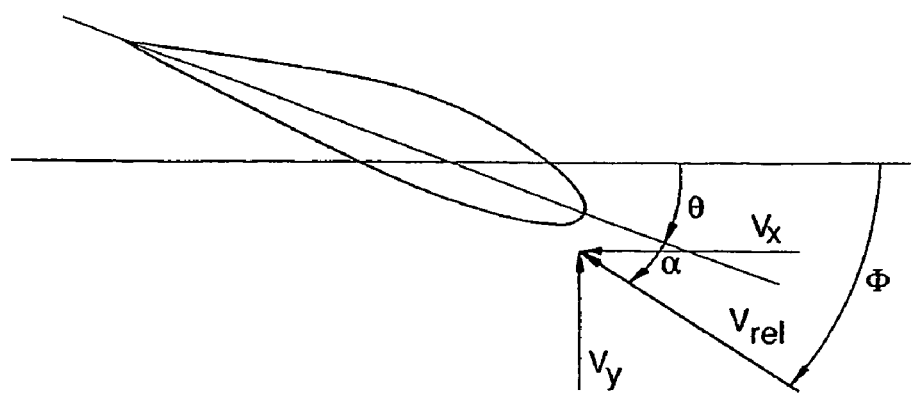

See FIG. 16 for explanation of nomenclature.

Figure 9:
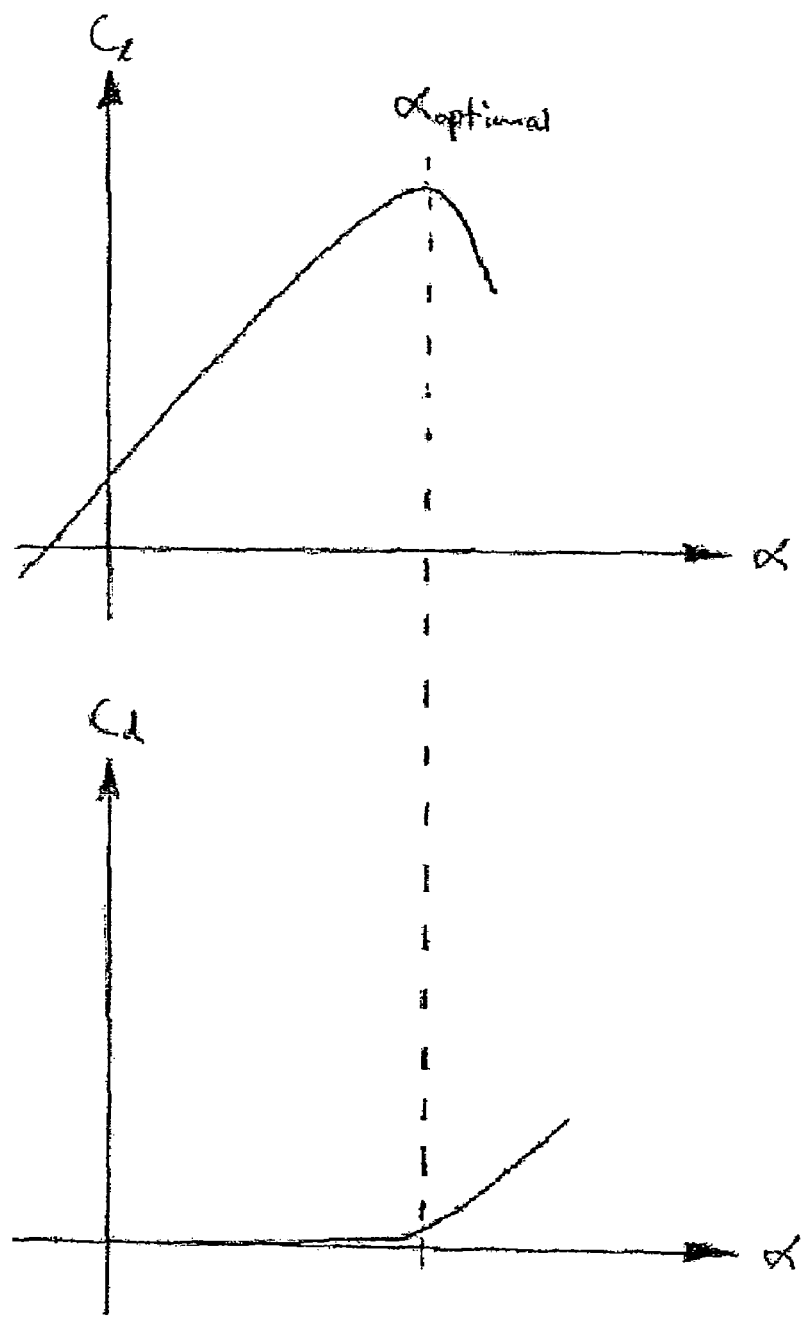

Since the angle of attack is measured it is also possible to optimise the collective pitch angles, hence produce more power. The reason for this is that the local aerodynamic profile has an optimal angle of attack, where the lift is high and the drag is low. At low wind speed, where a power output optimisation is desired, the collective pitch angle setting can be controlled by the average angle of attack measurement, see FIG. 9.

Figure 10:
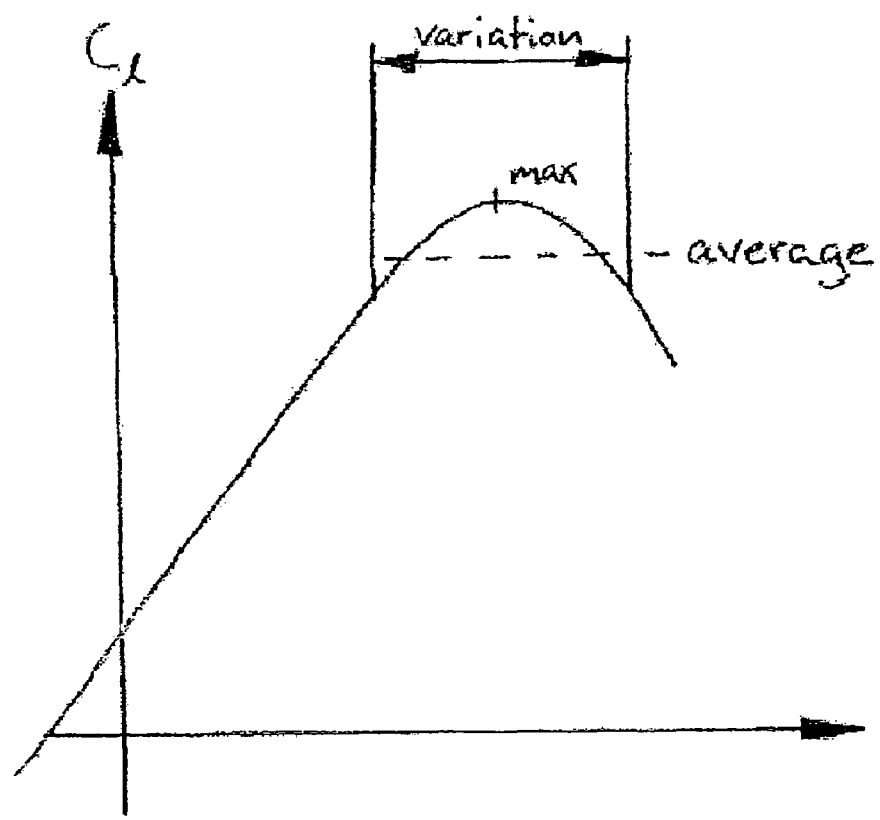

Since the relation between lift, drag and angle of attack is highly non-linear in the region of max. lift the load reducing control part stated above is believed to result in better power output performance as the angle of attacks of the blades will be more constant, hence have a higher mean average in lift, see FIG. 10.

Methods on Controlling the Aerodynamic Properties

The basic method of controlling the aerodynamic lift and drag of the blades is by changing the pitch angles of the individual blades as stated above. Methods of changing the pitchangles individually can be found in e.g. EP 1 241 350 A1 U.S. Pat. No. 5,011,373, EP 0 359 624 B1.

Figure 11:
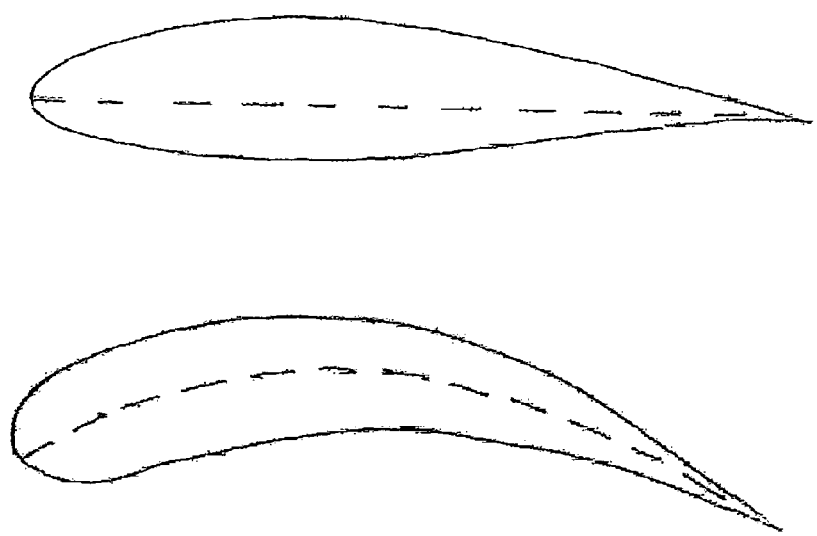

A second method of changing the aerodynamic load is by having a blade where the camber of the profile could be controlled actively, see FIG. 11.

Figure 12:
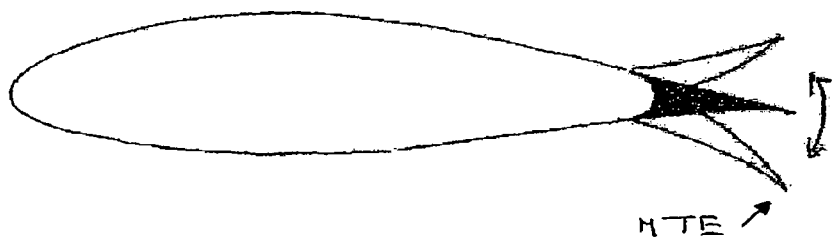

A third method of changing the aerodynamic profile is by flaps or ailerons, see FIG. 12.

Load Comparison

The control systems have been compared through aeroelastic simulation with the code HAWC, see Petersen-1997, Larsen-2001. Several types of simulations have been performed starting with basic simulations in deterministic wind fields to understand the behavior of the different controllers and ending with simulations in stochastic turbulence as the turbine would experience in practice. The turbine used in the simulations has a rated nominal power of 2~MW.

Operation in Shear and Yaw Error

The different control strategies are simulated in a variety of situations both with and without natural turbulence. However to illustrate the fundamental behavior of the different systems simulations in deterministic windfields without turbulence is shown in FIG. 17 to 22. The special negative wind shear is similar to the positive but with increasing wind speed from the hub to 50% higher at rotor bottom. In all simulations without turbulence the rotor tilt angle is set to zero since this basically corresponds to a yaw error contribution.

Figure 17:
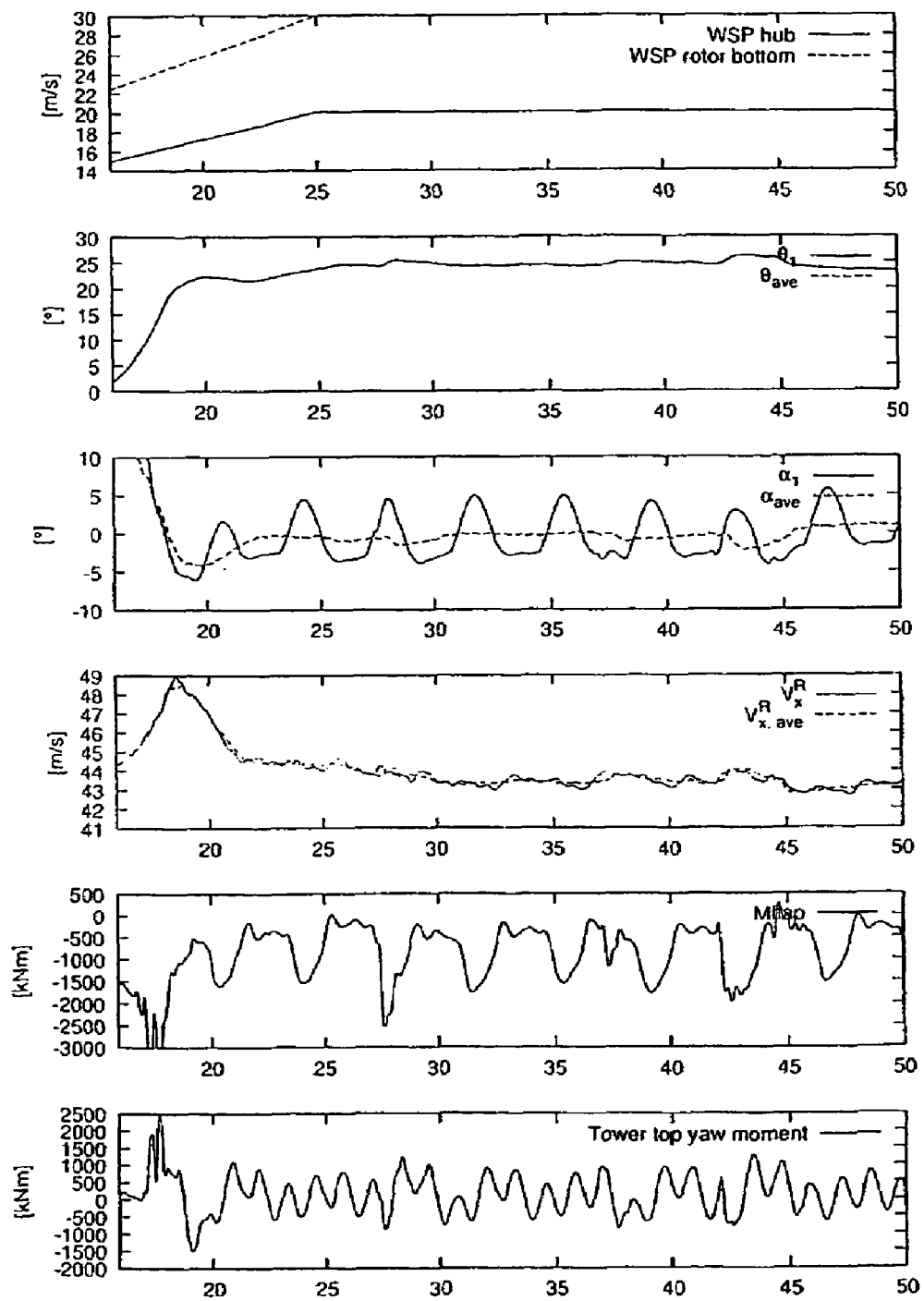
Figure 18:
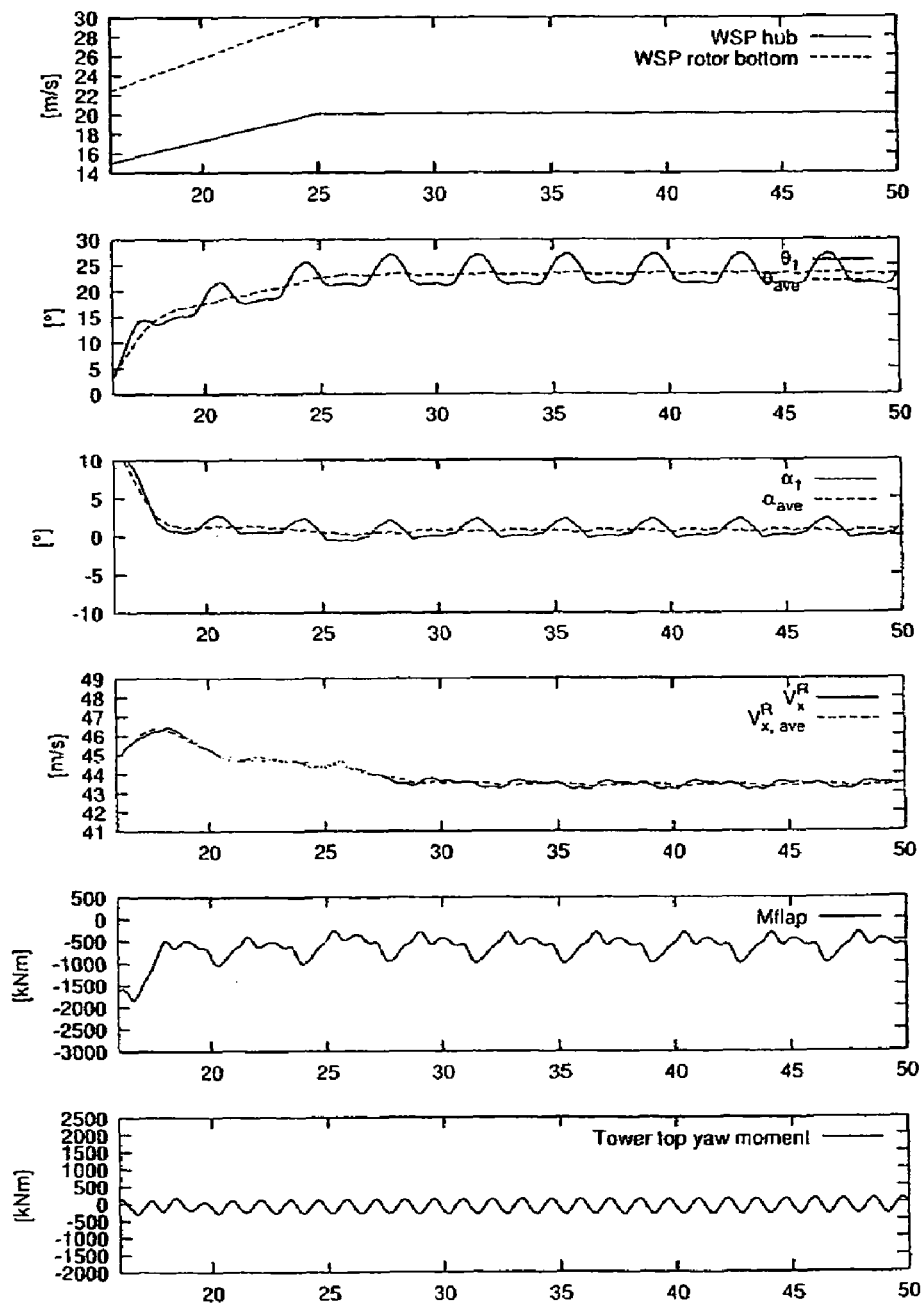
Figure 19:
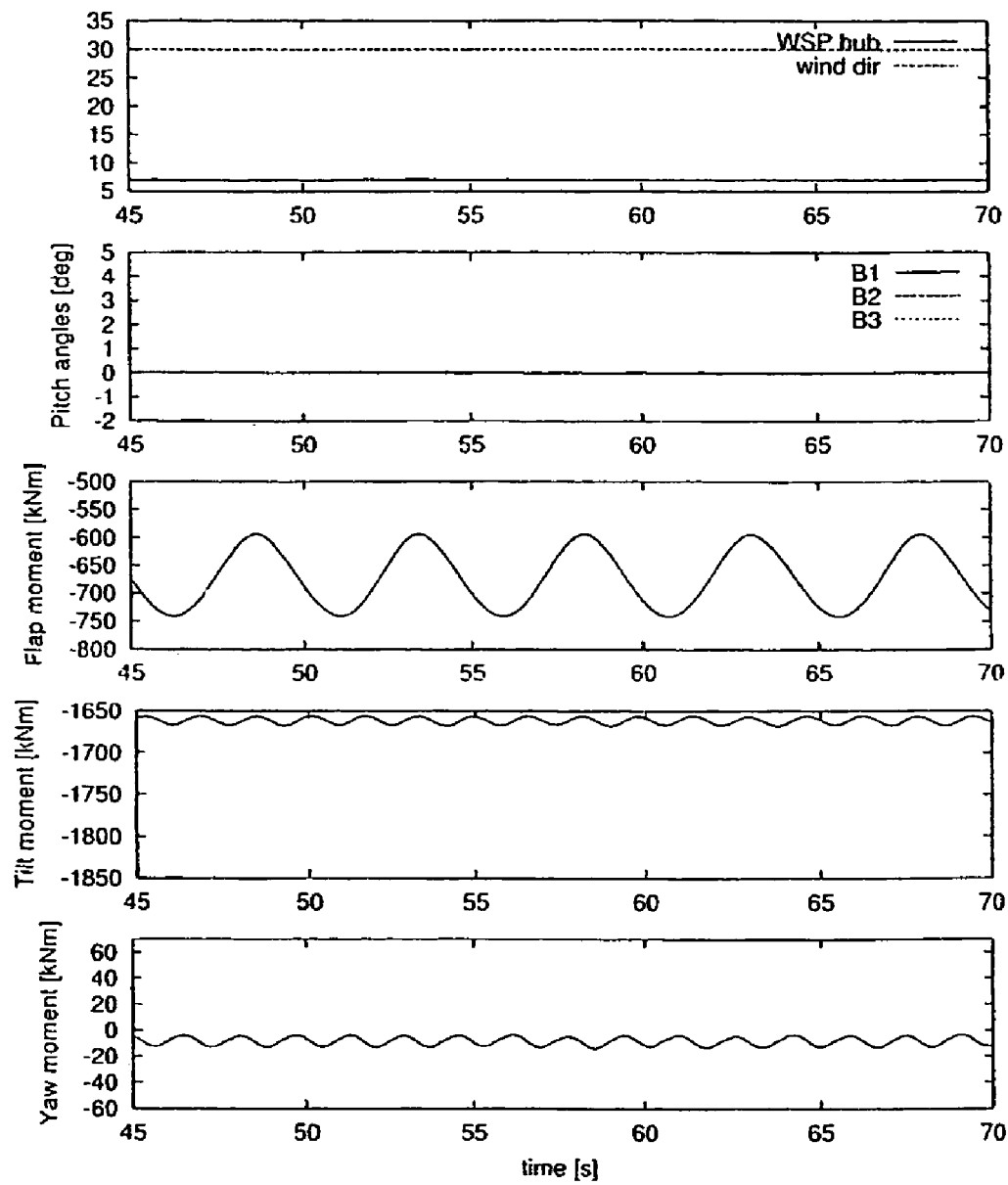
FIG. 19 shows collective pitch regulation at 30 deg yaw error at 7 m/s. From top: Wind speed and wind direction at hub, pitch angles, blade 1 flap moment at root, tower top tilt moment and tower top yaw moment.
Figure 20:
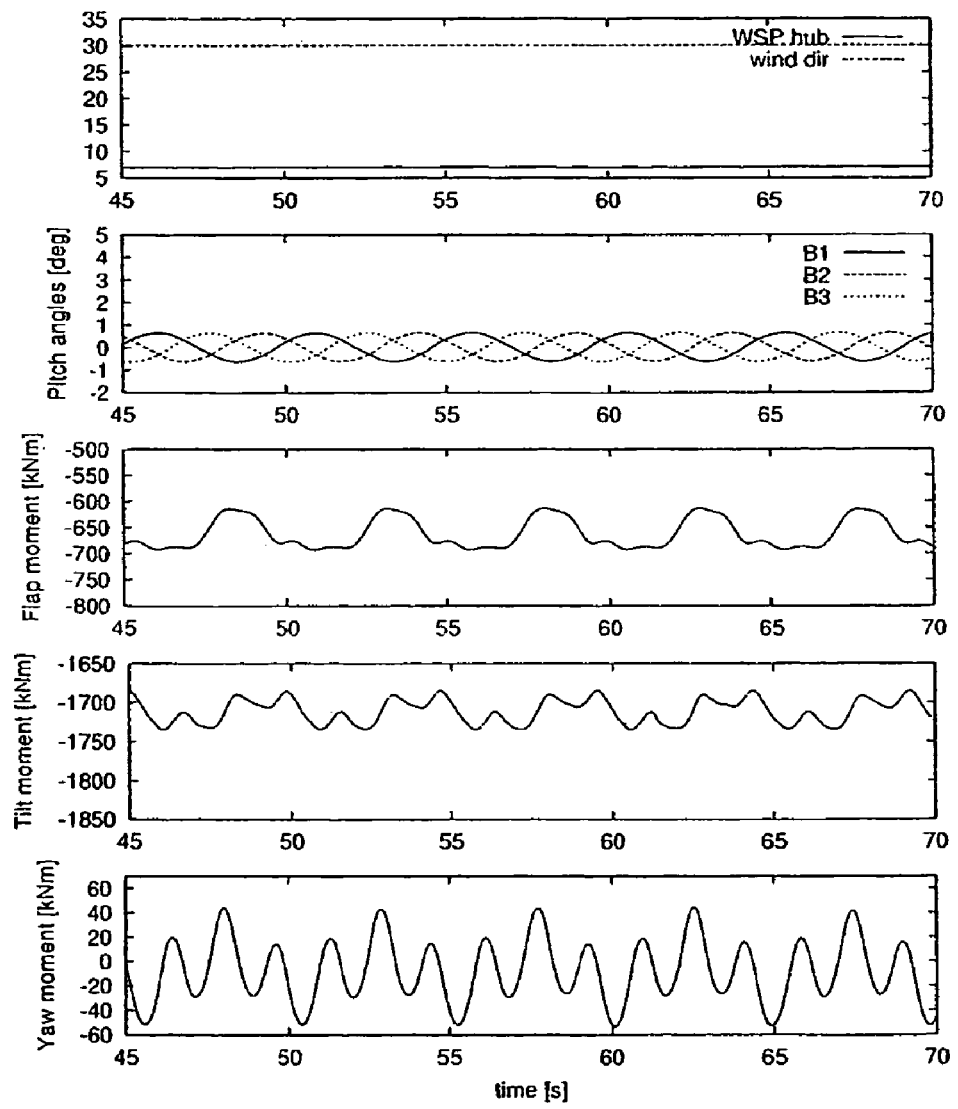
FIG. 20 shows individual pitch regulation at 30 deg yaw error at 7 m/s. From top: Wind speed and wind direction at hub, pitch angles, blade 1 flap moment at root, tower top tilt moment and tower top yaw moment.
Figure 21:
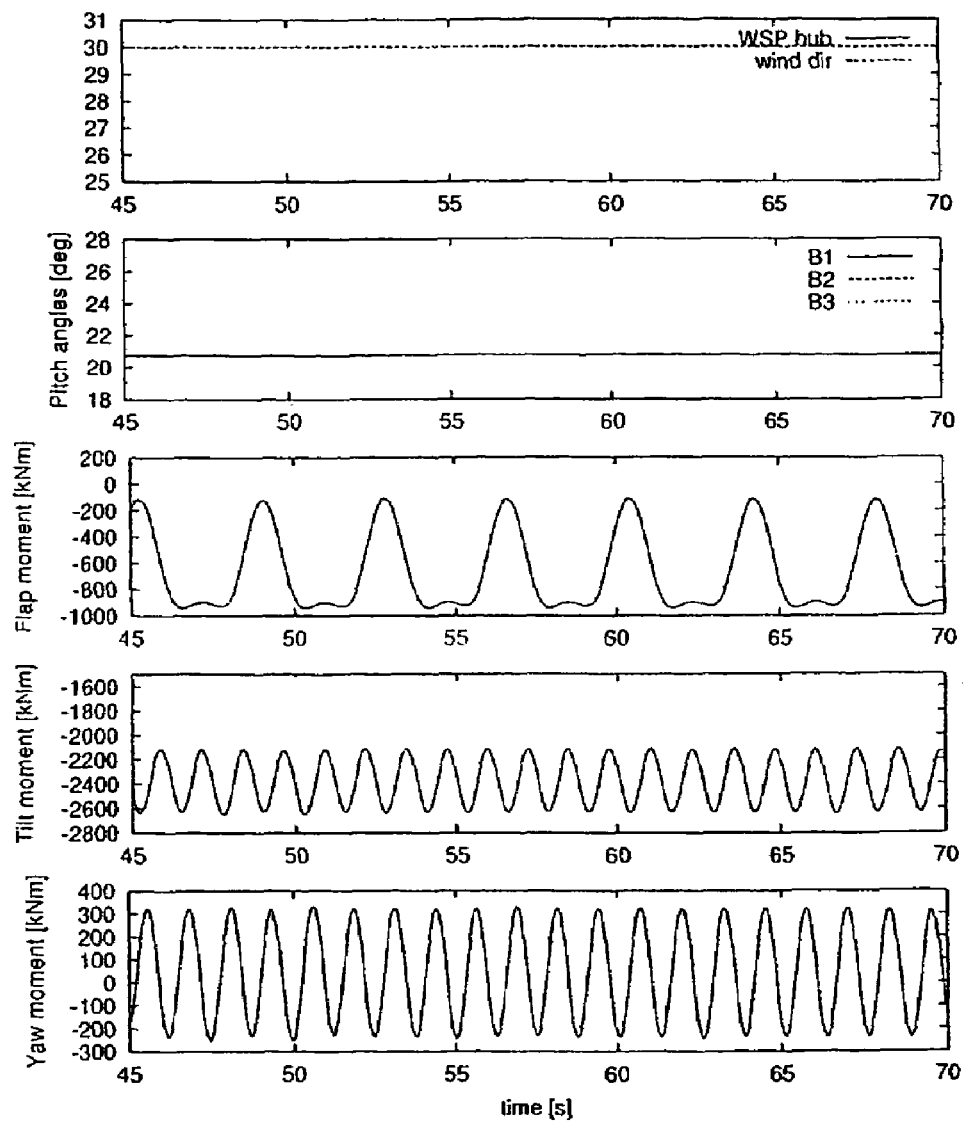
FIG. 21 shows collective pitch regulation at 30 deg yaw error at 25 m/s. From top: Wind speed and wind direction at hub, pitch angles, blade 1 flap moment at root, tower top tilt and tower top yaw moment.
Figure 22:
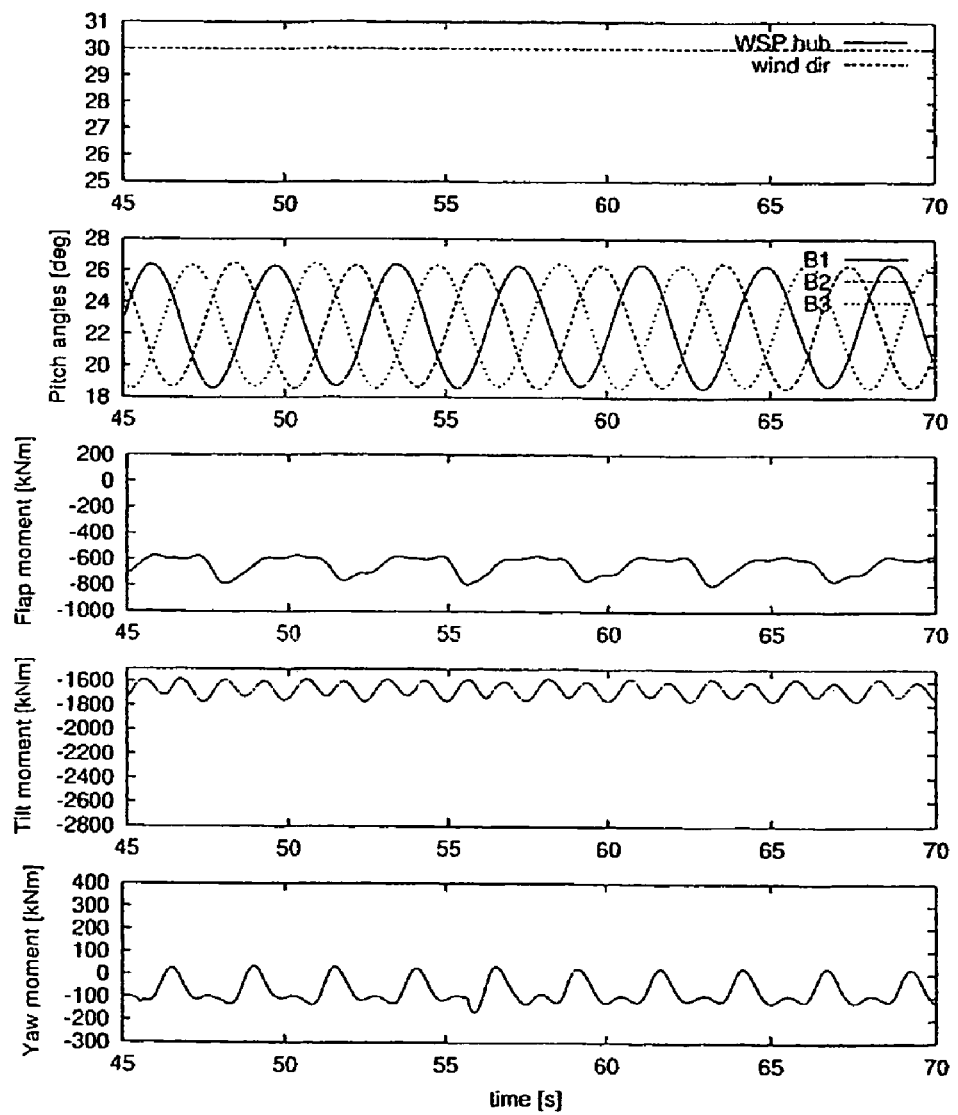
FIG. 22 shows individual pitch regulation at 30 deg yaw error at 25 m/s. From top: Wind speed and wind direction at hub, pitch angles, blade 1 flap moment at root, tower top tilt moment and tower top yaw moment.

In FIG. 17 is seen the behaviour of a turbine equipped with a collective pitch regulation. Large loads are seen at the blade flap moment and on the tower top yaw moment. In FIG. 18 is seen the behaviour of a turbine equipped with the individual pitch system. The blade flap moments and the tower top yaw moments are reduced and so is the difference in angle of attack compared to the average angle of attack of the three blades. The pitch angles are varied non-sinusoidal, which is the main reason of the very low yaw moments.

In FIG. 19 to 22 is seen simulations with the turbine operating in yaw error. The individual pitch systems results in a load reduction compared to the collective pitch systems in blade flap moment, tower top tilt moment and tower top yaw moment.

Fatigue Load Calculations.

To compare the loads from the different control strategies (collective, cyclic and individual) a fatigue load spectrum based on IEC61400-1 dass 1B has been calculated. The load cases are normal production cases with a yaw error of ±10% and wind speeds ranging from 4 m/s to 24 m/s. Wind conditions for a turbine class 1B $V_{ave}$=10.0 m/s, $I_{15}$=0.16, a=3). Roughness length is 0.2 m which corresponds to the wind shear specified in IEC61400. The turbulence is modeled with the Mann model, see Mann-1998.

Figure 23:
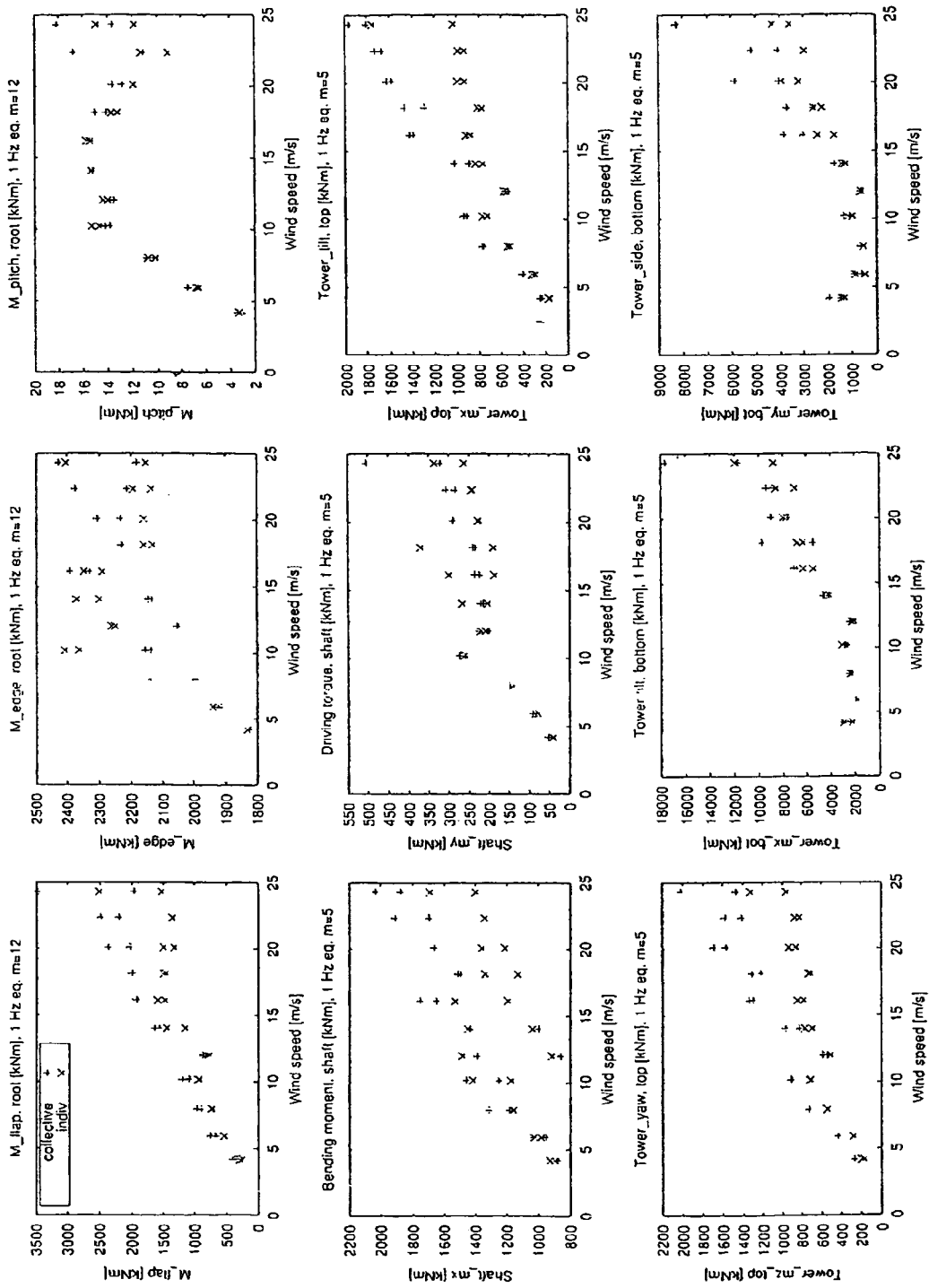
FIG. 23 shows 1 Hz equivalent loads for selected sensors.

To get an overview of the total reduction in fatigue load for the wind turbine equivalent loads of selected load sensors are presented in FIG. 23 and Table 1. The extreme loads during operation is shown in Table 2.

Figure 24:
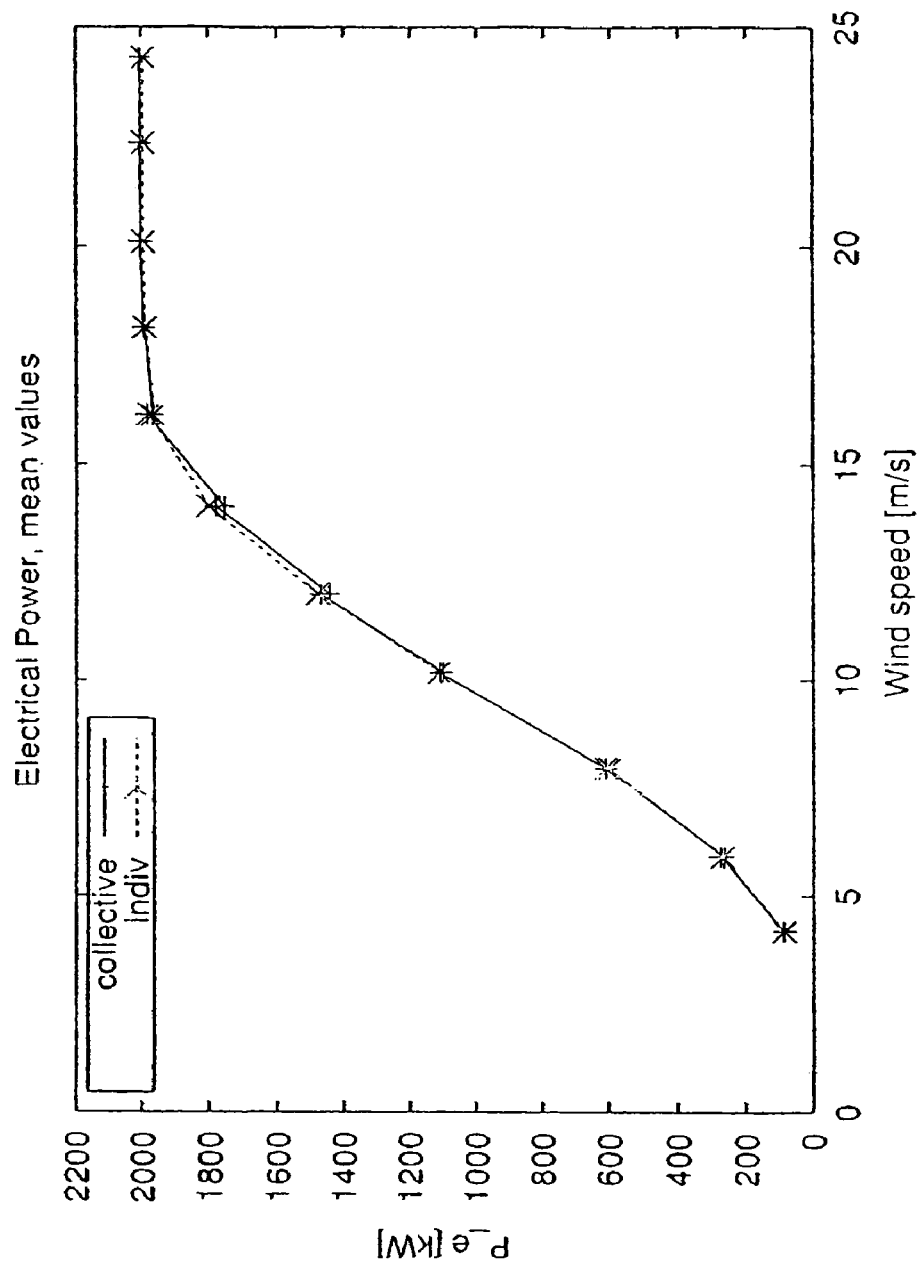
FIG. 24 shows electrical power mean values. A small difference is seen at wind speed between 10 and 16 m/s.

The influence of power production is shown in FIG. 24. The 20 year production is increased with 0.6% for the individual pitch compared to the collective pitch regulation.

TABLE 1

Comparison of 20 years fatigue loads, n = $10^7$ - indexed

| Sensor | m | Collective | Individual |
|---|---|---|---|
| Blade flap at hub | 12 | 1.0 | 0.72 |
| Blade pitching | 12 | 1.0 | 1.01 |
| Driving torque | 5 | 1.0 | 1.00 |
| Shaft bending at hub | 5 | 1.0 | 0.91 |
| Tower top tilt | 5 | 1.0 | 0.69 |
| Tower top yaw | 5 | 1.0 | 0.65 |
| Tower bottom tilt | 5 | 1.0 | 0.78 |
| Tower bottom side | 5 | 1.0 | 0.59 |

TABLE 2

Comparison of extreme loads during operation - indexed

| Sensor | Collective | Individual |
|---|---|---|
| Blade flap at hub | 1.0 | 0.86 |
| Blade pitching | 1.0 | 0.94 |
| Driving torque | 1.0 | 0.79 |
| Shaft bending at hub | 1.0 | 0.98 |
| Tower top tilt | 1.0 | 1.03 |
| Tower top yaw | 1.0 | 0.68 |
| Tower bottom tilt | 1.0 | 0.70 |
| Tower bottom side | 1.0 | 0.64 |

REFERENCES

Madsen-1991: H. A. Madsen. *Aerodynamics and Structural Dynamics of a Horizontal Axis Wind Turbine*. Risø-M-2902, Risoe, National Laboratory, February 1991.

Caselitz-1997: P. Caselitz, W. Kleinkauf, T. Krüger, J. Petschenka, M. Reichardt and K. Störzel. *Reduction of fatigue loads on wind energy converters by advanced control Methods*. Proceedings of the international conference held in Dublin Castle, Ireland. IWEA 1997

Bossanyi-2003: E. A. Bossanyi. *Individual Blade Pitch Control for Load Reduction*. Wind Energy, 6:119-128. 2003

Petersen-1996: J. T. Petersen. *The Aeroelastic Code HawC—Model and Comparisons*. $28^{th}$ IEA Experts Meeting: 'State of the Art of Aeroelastic-Codes'. DTU, Lyngby, 1996

Larsen-2001: T. J. Larsen. *Description of the DLL Regulation Interface in HAWC*. Risø-R-1290(en), Risoe, National Laboratory, September 2001.

Mann-1998: J. Mann. *Wind Field Simulation*. Prob. Engng. Mech., Elsevier Science, vol 13(no4):pp 269-283, 1998

The invention claimed is:

1. A method for controlling individually the operational condition of each blade of a wind turbine comprising one or more blades, said method comprising the steps of determining at least one aerodynamic flow property in the vicinity of each blade and determining based on the determined at least one aerodynamic flow property one or more operational conditions for each blade, wherein the one or more operational conditions comprises a pitch angle,
   i) wherein said pitch angle comprises a contribution determined based on the angle of attack for the blade and a contribution determined based on a wind velocity relative to the blade,
   ii) and wherein the contribution determined based on the angle of attack is determined based on a determined error between the instant angle of attack of the blade and the average angle of attack for all blades.

2. A method according to claim 1, wherein the determined error between the instant angle of attack and the average angle of attack is determined based on at least one skew inflow condition resulting in a variation in in-plane relative velocity.

3. A method according to claim 1, wherein the contribution determined on the basis of the relative velocity is determined in phase with a difference in relative velocity.

4. A method according to claim 1, wherein the contribution determined on the basis of the relative velocity is determined based on an error between in-plane relative velocity on the single blade and the average in-plane velocity of all the blades multiplied by a gain function.

5. A method according to claim 1, wherein the at least one flow property comprises the instant angle of attack.

6. A method according to claim 5, wherein the instant angle of attack is determined by at least one of a pitot tube, a trailing edge flap hinge, a sonic anemometer, a pressure measurement on the blade surface, and a laser dopler anemometer.

7. A method according to claim 1, wherein the at least one flow property comprises the instant local wind velocity.

8. A method according to claim 7, wherein the local wind velocity is being measured by utilizing at least one of a pitot tube, a sonic anemometer, a laser dopler anemometer, and a pressure measurement on the blade surface.

9. The method of claim 7, wherein the blades are arranged in a non-rotatable manner to the hub.

10. A method according to claim 1, wherein the at least one flow property is measured locally.

11. The method of claim 10, wherein the at least one flow property is measured at ¾ to ⅚ of blade radius.

12. A method according to claim 1, wherein the one or more blades are attached to a hub in such a manner that each blade can be individually rotated along its longitudinal axis, and wherein the one or more operational conditions determined comprise an individual pitch angle for each blade and wherein the method comprises setting each blade at their determined individual pitch angle.

13. A method according to claim 1, wherein each blade has a movable flap or aileron and the one or more operational conditions comprise the setting of the movable flap or aileron.

14. A method according to claim 1, comprising one or more of the following steps:
   i) recording the air pressure on the front of each blade
   ii) recording the pressure on the trailing edge of each blade
   iii) recording the pressure on the leading edge of each blade
   iv) recording a mechanical load measured at the connection between the blade and the hub;
   v) recording the forces in the supporting structure
   vi) recording the pitch angle of each blade
   vii) recording the wind speed in the vicinity of standing wind turbines
   viii) recording auxiliary data
   ix) transferring at least one of recorded data and determined flow properties to analyzing means,
and/or
   x) analyzing the data stored in the storing means.

* * * * *